United States Patent Office 3,515,560
Patented June 2, 1970

3,515,560
FLUOROCARBON GAS AS A FOAM IMPROVING ADDITIVE FOR CARBONATED BEVERAGES
Peter D. Bayne, Shorewood, Wis., assignor to Jos. Schlitz Brewing Company, Milwaukee, Wis., a corporation of Wisconsin
No Drawing. Filed Aug. 15, 1966, Ser. No. 572,223
Int. Cl. C12h 1/14
U.S. Cl. 99—49    8 Claims

ABSTRACT OF THE DISCLOSURE

A carbon dioxide containing beverage having improved foam characteristics is produced by dissolving in the beverage in addition to the carbon dioxide, a non-toxic fluorocarbon gas.

---

This invention relates to a gas-containing beverage and to a method of improving the foam retention and foam density of a carbonated, fermented malt beverage, such as beer, and carbonated soft drinks, especially ginger and root beer types.

Fermented malt beverages, such as beer and ale, in the bottled or draught state, contain dissolved carbon dioxide which is generally present in an amount of about 2.3 to 3.0 volumes of carbon dioxide gas per unit volume of beer. When the container is opened or a tap actuated and the beer is poured, carbon dioxide bubbles become coated with surface active materials as they ascend through the liquid. In effect each bubble includes a skin composed of a concentrated solution of surface active nitrogenous substances accompanied by other beer constituents such as alcohol, dextrins and gums. The dextrins and gums have little or no surface activity but they increase the viscosity of the bubble films. An accumulation of bubbles with their associated films at the liquid surface provides the foam or head characteristic of beer.

Once the head is formed is begins to collapse more or less quickly depending on the conditions. Drainage of liquid takes place from the surface films thus weakening the films, and since the pressure inside a bubble is inversely proportional to its radius, small bubbles coalesce to larger ones with smaller internal pressure. Further drainage and diffusion of gas through the films leads to further coalescence until the whole film collapses leaving a thin skin of denatured nitrogenous material behind. The rate of bubble drainage will be smaller as the viscosity of the films increase and therefore dextrinous and gummy materials play a part contributing to foam stability. In addition, hop resins also play an important part in contributing to the stabilization of the foam. The amount of dissolved carbon dioxide effects foam generation or the height of the foam developed, but the amount of dissolved gas does not directly effect the foam retention or the density of the foam. Foam retention refers to the stability of the foam and its ability to resist collapse, while foam density refers to the texture and bubble size of the foam.

It is of prime importance to the brewer to have a creamy dense foam which will be retained for long periods for the consumer relates foam retention and density to a high quality beer.

However, there are several factors which tend to reduce foam stability and density of beer and other malt beverages. Greases and oils reduce the surface tension and therefore decrease foam retention or stability. In the brewing process all contact with greases, oils and hydrophobic materials is maintained at a strict minimum. In this regard, the natural oils of the brewing raw materials, particularly corn grits and rice, are watched carefully and the pipelines, valves and the like are frequently degreased.

In spite of these precautions, substances which affect the stability of foam find their way into the brewing process and tend to partially reduce the foam retention of the beer or other malt beverage.

As an added factor, the contemporary diet includes many oil-containing foods which, if eaten along the beer, leave an oily ring on the glass. This oily ring is difficult to remove from the glass and contributes to reducing the foam retention of beer subsequently poured into the glass. Moreover, the common dishwashing detergents used to clean glassware also markedly reduce the foam stability of beer, if not completely rinsed from the glasswase after the sanitizing operation.

Foam retention is particularly important in the dispensing of draft beer. If the foam retention is relatively poor and the foam collapses early, more beer is required to fill the glass. Thus it is of primary importance in dispensing draft beer or other malt beverages to have a thick, dense non-collapsing foam.

Recently there has been a trend in the brewing industry to reduce the amount of malt and hops in the brewing process. The literature shows that foaming characteristics are in great part produced by the malt and hops, and by using a smaller quantity of malt and hops, there is a tendency to reduce foam generation as well as foam retention. As the trend is to reducing foam generation and thereby producing a head of lesser height, it is even more important to retain that head.

While foam retention and density are not directly related to foam generation, some breweries nevertheless add increased quantities of carbon dioxide in order to obtain greater foam generation. Increasing the original foam height results in a higher head after a given period of time, assuming a given rate of foam collapse. However, the added amount of carbon dioxide not only increases the overall cost of the brewing process but also increases the tendency for wild beer and increases the probability of bottle breakage.

As the retention and density of foam are of prime importance to the brewer, several methods have been employed in the past in an attempt to increase the foam retention or stability and density. In some cases gums, such as gum arabic, have been added to the beer. The gums are extremely difficult to dissolve due to their very slight solubility in water, and precipitates often result which can cause serious filtration problems. Other materials which have been used in an attempt to increase the foam characteristics of beer are the salts of alginic acids. Again, these materials are sparingly soluble when injected into the beer. Morever, the salts of alginic acids are costly and are not completely effective for foam retention.

Salts of heavy metals, such as nickel and cobalt, have also been added to beer to increase the foam characteristics. These materials form complexes with isohumulone, which tend to increase the foam stability. However, only small quantities of these heavy metal salts can be added, due to their toxic nature, so that the full effect of these materials cannot be realized.

While the above materials have been added in the past to increase foam characteristics, all of the materials have the disadvantage of influencing only one aspect of the foam characteristics. If the material increases foam retention, it does not have any effect on foam density or texture, and conversely, if the material produces a more dense foam it does not increase the foam retention.

The present inventiton relates to a gas-containing beverage, and particularly a fermented malt beverage, having improved foam retention and foam density. According to the invention, a fluorocarbon gas is dissolved in the beverage along with carbon dioxide. The dissolved fluorocarbon gas coacts with the dissolved carbon dioxide to increase the stability of the individual carbon dioxide bubbles as the beverage is poured and provides a tough, outer skin for the bubble, thereby substantially increasing foam stability or retention and providing a thicker, denser foam.

The beverage containing the mixture of dissolved gases is preferably a fermented malt beverage such as beer or ale. However, the mixture of gases can also be injected in non-alcoholic malt beverages as well as soft drinks to improve the foam characteristics of these beverages. However, the invention is most applicable to fermented malt beverages, for it is with this type of beverage that foam retention and foam density are most important.

The fluorocarbon gas which is dissolved in the beverage can either be a single compound or a mixture of various fluorocarbons. Fluorocarbon gases such as those sold under the tradename of Freons are chemically inert, non-toxic and are sufficiently stable to hydrolysis so that they do not increase the fluoride ion content of the beverage to any objectionable extent and thus have no adverse effect on the odor, taste, or appearance of the beverage. Examples of fluorocarbon gases which can be used are perfluorocyclobutane, chlorotrifluoromethane, tetrafluoromethane, chloropentafluoroethane, and mixtures thereof.

The fluorocarbon gas is preferably dissolved in the beverage up to its limit of solubility which is generally in the range of about 10 to 100 parts per million, corresponding to about .001 to .01% by weight. While the most desirable improvement in foam stability and texture is achieved by employing the fluorocarbon gas up to its limit of solubility, lesser proportional improvement can be achieved by employing smaller amounts of the fluorocarbon gas.

The amount of carbon dioxide dissolved in the beer can vary within wide limits depending on the nature of the beverage and the desired foam generation. Most beers contain from about 2.3 to 3.0 volumes of dissolved carbon dioxide gas per unit volume of beer. With the addition of the dissolved fluorocarbon gas, the amount of carbon dioxide can be reduced over conventional practices or it can be retained at conventional levels depending on the foam generating characteristics desired. In most cases, the dissolved carbon dioxide content will be decreased, because the foam stability is markedly improved and thus the height of the original head can be reduced.

The fluorocarbon can be added to the beverage either as a gas or a liquified gas and can be added along with the carbon dioxide or separately. It is preferred to add the fluorocarbon as well as the carbon dioxide as the beer or other beverage is being pumped to the bottle house after pre-filtration to prevent excess dissolution of the dissolved gases.

If the fluorocarbon is added as a liquid, any excess liquid over and above that which will dissolve in the beverage, will be carried along in the pressurized system. However, the liquified fluorocarbon gases are heavier than beer and will sink to the bottom of the tanks beneath the level of risers so that the liquified gas will be left behind in the tanks and not carried through to the bottles, cans or other packages.

The second and most practical method of adding the fluorocarbon is in the gaseous state along with the carbon dioxide. The fluorocarbon gas and carbon dioxide can be added to the beverage by conventional techniques, such as carbonating stones or carbonating arms.

Liquified fluorocarbon gases, such as Freons, have been widely used in the past as propellants for many types of food products. When used as a propellant, a quantity of the liquified gas is located in the container along with the product to be dispensed and vaporization of the liquified gas maintains a vapor pressure in the headspace of the container which is greater than the atmospheric pressure. When the dispensing valve of a conventional dispensing unit of this type is opened, the product will be ejected from the container thereby increasing the volume of the headspace and additional quantities of liquified gas will be vaporized to maintain the vapor pressure in the headspace. In contrast to this common use of liquified fluorocarbon gases as propellants, the fluorocarbon gas in the invention is not being used as a propellant and there is no quantity of liquified gas in contact with the beverage. The fluorocarbon gas is dissolved in the liquid and the dissolved fluorocarbon gas does not aid or assist in propelling or dispensing the beverage from the container.

While it is recognized that by increasing the overall content of the dissolved gas in a beverage, a corresponding increase in the foam generation or foam height will result, the addition of the dissolved fluorocarbon gas, along with the dissolved carbon dioxide, is not merely the simple aggregation of two dissolved gases. In the beverage of the invention, the overall content of dissolved gas is not increased over conventional brewing practices. Instead, the dissolved fluorocarbon gas cooperates with the carbon dioxide gas in a unique and novel manner to improve the foam stability and the density of the foam, while not affecting the foam generation. It is believed that the fluorocarbon gas increases the stability of the individual bubbles of carbon dioxide by forming a tough, intermediate film between the carbon dioxide gas bubble and the aqueous phase or liquid. This tough outer skin for the bubble resists collapse and coalescence of the bubbles thereby retaining the height of the foam for extended periods and producing a thicker, creamier foam composed of smaller diameter bubbles.

The following tests illustrate the improvement in foam retention by the use of the invention as compared with a normal untreated control beer.

A series of bottles of beer containing 2.7 volumes of $CO_2$/volume of beer were treated with approximately 50 mg. per liter of perfluorocyclobutane and compared for foam retention against untreated control beer containing the same proportion of $CO_2$. The method used was one widely used in the brewing industry for determining foam retention, the Carlsberg method (American Society of Brewing Chemists Proceedings, p. 141, 1958). In this test, the retention characteristics are expressed in sigma units; the higher the number, the more superior the foam retention. The resultant values were obtained.

```
                                                    Sigma value
Untreated control beer _____ 130
Beer treated with perfluorocyclobutane _____ 187
```

The results indicate that the treated beer was vastly superior to the control beer having raised the sigma value by 57 units. Even treatment with various foam additives such as cobalt, gum arabic, or aglinate salts will only raise the sigma value by ten or fifteen units.

The texture of the foam of the treated beer was extremely dense and creamy with excellent clinging adhesion to the side of the glass. After twenty minutes, a substantial portion of the foam cap was intact and the portion that had collapsed still adhered to the side of the glass. The control beer, by contrast, had a thin, easily collapsed foam head with average clinging characteristics.

A second test was run on a control beer and beer that was saturated with a mixture of perfluorocyclobutane and chloropentafluoroethane (85:15 ratio) with the following results:

```
                                                    Sigma value
Untreated control beer _____ 110
Treated beer _____ 154
```

From the results of this test it is seen that the sigma value for the treated beer is very significantly higher than the untreated control beer. In addition the foam density, cling, and texture of the treated beer were far superior to that of the control beer.

By increasing the foam stability and improving the density or texture of the foam, the beer or other carbonated beverage is more appealing to the consumer.

As a further advantage, a smaller quantity of malt and hops can be employed in the beer and yet the foam stability and density will not be decreased over conventional beers.

The addition of the dissolved fluorocarbon gas in conjunction with the dissolved carbon dioxide produces improved foam characteristics without the addition of expensive foam additives which are commonly used in beer.

Various modes of carrying out the invention are contemplated as being within the scope of the following claims particularly pointing out and distinctly claiming the subject matter which is regarded as the invention.

I claim:

1. A fermented malt beverage, comprising an aqueous phase having dissolved therein carbon dioxide and a generally inert, nontoxic, fluorocarbon gas.

2. The beverage of claim 1, in which the fluorocarbon gas is dissolved substantially up to its solubility limit in the aqueous phase.

3. The beverage of claim 1, in which the amount of carbon dioxide dissolved in the aqueous phase is in the range of 2.3 to 3.0 volumes of carbon dioxide gas per volume of beverage.

4. The beverage of claim 1, in which the fluorocarbon is selected from the group consisting of perfluorocyclobutane, chlorotrifluoromethane, tetrafluoromethane, chloropentafluoroethane, and mixtures thereof.

5. A method of improving the foam stability and foam texture of a carbon dioxide-containing fermented malt beverage, comprising the step of dissolving in the beverage a quantity of a fluorocarbon gas.

6. The method of claim 5, in which the fluorocarbon gas is dissolved in the beverage substantially up to its limit of solubility in said beverage.

7. The method of claim 6, in which the dissolved carbon dioxide is in the range of 2.3 to 3.0 volumes of carbon dioxide gas per volume of beverage.

8. The method of claim 6, in which the fluorocarbon is selected from the group consisting of perfluorocyclobutane, chlorotrifluoromethane, tetrafluoromethane, chloropentafluoroethane, and mixtures thereof.

References Cited

UNITED STATES PATENTS

| | | | |
|---|---|---|---|
| 641,746 | 1/1900 | Wittemann | 99—49 |
| 1,261,294 | 4/1918 | Ritchey | 99—49 |
| 2,849,323 | 8/1958 | Young | 99—189 |
| 2,968,628 | 1/1961 | Reed | 99—79 |
| 3,072,487 | 1/1963 | Webster | 99—79 |
| 3,120,441 | 2/1964 | Asturias | 99—79 |
| 3,181,952 | 5/1965 | Mastrangelo | 99—79 |
| 3,369,912 | 2/1968 | Livengood et al. | 99—189 |
| 3,369,913 | 2/1968 | Livengood et al. | 99—189 |

A. LOUIS MONACELL, Primary Examiner

D. M. NAFF, Assistant Examiner

U.S. Cl. X.R.

99—28, 31, 48, 79